US010846130B2

(12) United States Patent
Corley et al.

(10) Patent No.: US 10,846,130 B2
(45) Date of Patent: Nov. 24, 2020

(54) EXTENSIBLE WORKFLOWS FOR PROCESSING CONTENT

(71) Applicant: Amazon Technologies, Inc., Reno, NV (US)

(72) Inventors: Jonathan B. Corley, Seattle, WA (US); Tal Saraf, Seattle, WA (US); Bradley E. Marshall, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 15/627,137

(22) Filed: Jun. 19, 2017

(65) Prior Publication Data

US 2017/0286162 A1    Oct. 5, 2017

Related U.S. Application Data

(63) Continuation of application No. 13/465,978, filed on May 7, 2012, now Pat. No. 9,710,307.

(51) Int. Cl.
*G06F 9/48* (2006.01)
(52) U.S. Cl.
CPC .......... *G06F 9/4881* (2013.01); *G06F 9/4843* (2013.01)
(58) Field of Classification Search
CPC .................................................... G06F 9/4843
See application file for complete search history.

(56) References Cited

U.S. PATENT DOCUMENTS

| | | |
|---|---|---|
| 5,541,852 A | 7/1996 | Eyuboglu et al. |
| 6,732,332 B1 | 5/2004 | Borysewcz et al. |
| 6,970,602 B1 | 11/2005 | Smith et al. |
| 7,231,023 B1 | 6/2007 | Begeja |
| 7,761,900 B2 | 7/2010 | Crayford |
| 7,958,532 B2 | 6/2011 | Paul et al. |
| 8,634,705 B2 | 7/2014 | Yogeshwar et al. |

(Continued)

OTHER PUBLICATIONS

Couvares P., Kosar T., Roy A., Weber J., Wenger K. (2007) Workflow Management in Condor. In: Taylor I.J., Deelman E., Gannon D.B., Shields M. (eds) Workflows for e-Science. Springer, London (Year: 2007).*

(Continued)

*Primary Examiner* — Charlie Sun
(74) *Attorney, Agent, or Firm* — Hogan Lovells US LLP (57) ABSTRACT

A system and method is described for enabling a user to add extensions to one or more of the preconfigured workflows for processing media content. The extensions can comprise a custom task that is injected at a specified entry point in the preconfigured workflow, such as after completion of a particular task. The custom task injected into the workflow can perform a variety of processing jobs, such as adding digital rights management (DRM), allowing access to the media content by third parties, injecting advertisements or other content into the media, checking the media content for errors or viruses, and the like. The custom task may also instruct the workflow to delegate access to the media content to external third party services. When the preconfigured workflow reaches the specified entry point, the workflow may be suspended until the custom task is completed, at which point the preconfigured workflow may resume.

13 Claims, 5 Drawing Sheets

(56) References Cited

U.S. PATENT DOCUMENTS

| | | | |
|---|---|---|---|
| 8,855,189 B1 | 10/2014 | Krause et al. | |
| 9,058,645 B1 | 6/2015 | Corley | |
| 9,078,091 B2 | 7/2015 | Lehtiniemi et al. | |
| 9,088,634 B1 | 7/2015 | Corley et al. | |
| 9,183,049 B1 | 11/2015 | Corley | |
| 9,189,484 B1 | 11/2015 | Velummylum | |
| 9,223,621 B1 | 12/2015 | Corley | |
| 9,292,896 B1 | 3/2016 | Corley | |
| 9,380,326 B1 | 6/2016 | Corley | |
| 9,483,785 B1 | 11/2016 | Corley | |
| 9,497,496 B1 | 11/2016 | Corley | |
| 9,510,033 B1 | 11/2016 | Corley | |
| 9,710,307 B1 | 7/2017 | Corley et al. | |
| 2002/0150247 A1 | 10/2002 | Linnartz et al. | |
| 2002/0170035 A1 | 11/2002 | Casati et al. | |
| 2006/0044597 A1* | 3/2006 | Dumitrescu | H04N 1/00477 |
| | | | 358/1.15 |
| 2006/0168630 A1 | 7/2006 | Davies | |
| 2007/0002946 A1 | 1/2007 | Bouton et al. | |
| 2007/0106622 A1 | 5/2007 | Boomershine | |
| 2007/0157260 A1 | 7/2007 | Walker | |
| 2007/0162945 A1 | 7/2007 | Mills | |
| 2007/0169113 A1 | 7/2007 | Moore et al. | |
| 2007/0174338 A1 | 7/2007 | Liggett | |
| 2008/0034393 A1 | 2/2008 | Crayford | |
| 2008/0081648 A1 | 4/2008 | Kang et al. | |
| 2008/0146160 A1 | 6/2008 | Jiang et al. | |
| 2008/0205510 A1 | 8/2008 | Komi et al. | |
| 2008/0242280 A1 | 10/2008 | Shapiro et al. | |
| 2008/0301588 A1 | 12/2008 | Kumar et al. | |
| 2009/0043888 A1 | 2/2009 | Jackson | |
| 2009/0083279 A1 | 3/2009 | Hasek | |
| 2009/0171674 A1* | 7/2009 | Mitsumori | G11B 20/00007 |
| | | | 704/500 |
| 2009/0172685 A1 | 7/2009 | Shavit | |
| 2009/0254672 A1 | 10/2009 | Zhang | |
| 2009/0276266 A1 | 11/2009 | Masashi | |
| 2009/0276716 A1 | 11/2009 | Chua | |
| 2010/0017516 A1 | 1/2010 | Sparrell et al. | |
| 2010/0054148 A1 | 3/2010 | Murakami et al. | |
| 2010/0054327 A1 | 3/2010 | Capless | |
| 2010/0076805 A1 | 3/2010 | Batsakis et al. | |
| 2010/0088505 A1 | 4/2010 | Coppola et al. | |
| 2010/0131674 A1 | 5/2010 | Vecchio | |
| 2010/0195540 A1 | 8/2010 | Kerr et al. | |
| 2010/0199299 A1 | 8/2010 | Chang et al. | |
| 2010/0205616 A1 | 8/2010 | Lai et al. | |
| 2010/0250710 A1 | 9/2010 | Cadwell et al. | |
| 2010/0281042 A1 | 11/2010 | Windes et al. | |
| 2010/0309794 A1 | 12/2010 | Keynan et al. | |
| 2010/0332262 A1 | 12/2010 | Horvitz et al. | |
| 2011/0019870 A1 | 1/2011 | Ballocca et al. | |
| 2011/0082982 A1 | 4/2011 | Harvell et al. | |
| 2011/0088076 A1 | 4/2011 | Li et al. | |
| 2011/0153628 A1 | 6/2011 | Basu et al. | |
| 2011/0197221 A1 | 8/2011 | Rouse et al. | |
| 2011/0209162 A1 | 8/2011 | MacHiraju et al. | |
| 2011/0310995 A1 | 12/2011 | Dougherty, III et al. | |
| 2011/0313982 A1 | 12/2011 | Kranendonk et al. | |
| 2011/0314093 A1* | 12/2011 | Sheu | G06F 9/4445 |
| | | | 709/203 |
| 2012/0030341 A1 | 2/2012 | Jensen et al. | |
| 2012/0030376 A1 | 2/2012 | Lemus et al. | |
| 2012/0072542 A1 | 3/2012 | McGowan | |
| 2012/0079054 A1 | 3/2012 | Moroney et al. | |
| 2012/0089687 A1 | 4/2012 | Katz | |
| 2012/0102154 A1 | 4/2012 | Huang et al. | |
| 2012/0131591 A1 | 5/2012 | Moorthi et al. | |
| 2012/0158645 A1 | 6/2012 | Shafiee et al. | |
| 2012/0159494 A1* | 6/2012 | Shafiee | G06F 9/5038 |
| | | | 718/102 |
| 2012/0159503 A1 | 6/2012 | Shafiee et al. | |
| 2012/0192239 A1 | 7/2012 | Harwell et al. | |
| 2012/0209942 A1 | 8/2012 | Zehavi et al. | |
| 2012/0236201 A1 | 9/2012 | Larsen et al. | |
| 2012/0254456 A1 | 10/2012 | Visharam et al. | |
| 2012/0265847 A1 | 10/2012 | Swenson et al. | |
| 2012/0272245 A1* | 10/2012 | Ryman | G06F 11/3006 |
| | | | 718/100 |
| 2012/0278441 A1 | 11/2012 | Li et al. | |
| 2012/0331089 A1 | 12/2012 | Vonog et al. | |
| 2013/0019311 A1 | 1/2013 | Swildens | |
| 2013/0036117 A1* | 2/2013 | Fisher | G06F 17/30029 |
| | | | 707/736 |
| 2013/0054827 A1 | 2/2013 | Feher et al. | |
| 2013/0222838 A1* | 8/2013 | Kumar | G06F 3/1287 |
| | | | 358/1.14 |
| 2013/0243075 A1* | 9/2013 | Dalela | H04L 65/80 |
| | | | 375/240.01 |
| 2014/0115592 A1* | 4/2014 | Frean | G06F 9/5027 |
| | | | 718/102 |
| 2014/0258441 A1 | 9/2014 | L'Heureux et al. | |
| 2014/0359092 A1 | 12/2014 | Middleton et al. | |

OTHER PUBLICATIONS

"Non-Final Office Action dated Nov. 17, 2016" received in U.S. Appl. No. 14/801,784.

"Final Office Action dated Jun. 16, 2017" received in U.S. Appl. No. 14/801,784.

"Non-Final Office Action dated Sep. 24, 2014" received in U.S. Appl. No. 13/465,944.

"Final Office Action dated Feb. 20, 2015" received in U.S. Appl. No. 13/465,944.

"Non-Final Office Action dated Jul. 31, 2015" received in U.S. Appl. No. 13/465,944.

"Final Office Action dated Mar. 21, 2016" received in U.S. Appl. No. 13/465,944.

"Notice of Allowance dated Jul. 20, 2016" received in U.S. Appl. No. 13/465,944.

"Non-Final Office Action dated Oct. 22, 2015" received in U.S. Appl. No. 13/465,960.

"Final Office Action dated Jun. 3, 2016" received in U.S. Appl. No. 13/465,960.

"Final Office Action dated Sep. 11, 2014," U.S. Appl. No. 13/465,975.

"Non-Final Office Action dated Jan. 16, 2015" issued in U.S. Appl. No. 13/465,975.

"Final Office Action dated Sep. 8, 2015" received in U.S. Appl. No. 13/465,975.

"Notice of Allowance dated Aug. 3, 2016" issued in U.S. Appl. No. 13/465,975.

"Non-Final Office Action dated Feb. 4, 2014" received in U.S. Appl. No. 13/465,978.

"Final Office Action dated Jul. 3, 2014" received in U.S. Appl. No. 13/465,978.

"Non-Final Office Action dated Jan. 29, 2015" received in U.S. Appl. No. 13/465,978.

"Final Office Action dated Aug. 27, 2015" received in U.S. Appl. No. 13/465,978.

"Non-Final Office Action dated Jul. 14, 2016" issued in U.S. Appl. No. 13/465,978.

"Notice of Allowance dated Mar. 27, 2017" issued in U.S. Appl. No. 13/465,978.

"Non-Final Office Action dated Jul. 17, 2015" received in U.S. Appl. No. 13/465,987.

"Non-Final Office Action dated Apr. 2, 2013" issued in U.S. Appl. No. 13/465,987.

"Final Office Action dated Oct. 24, 2013" issued in U.S. Appl. No. 13/465,987.

"Non-Final Office Action dated Jul. 17, 2015" issued in U.S. Appl. No. 13/465,987.

"Final Office Action dated Aug. 8, 2016" issued in U.S. Appl. No. 13/465,987.

"Notice of Allowance dated Apr. 11, 2017" issued in U.S. Appl. No. 13/465,987.

"Non-Final Office Action dated Jul. 29, 2014" received in U.S. Appl. No. 13/465,992.

(56) References Cited

OTHER PUBLICATIONS

"Final Office Action dated Feb. 23, 2015" received in U.S. Appl. No. 13/465,992.
"Non-Final Office Action dated Jul. 14, 2015" received in U.S. Appl. No. 13/465,992.
"Notice of Allowance dated Mar. 8, 2016" received in U.S. Appl. No. 13/465,992.
"Non-Final Office Action dated Jun. 5, 2015" received in U.S. Appl. No. 14/682,004.
"Notice of Allowance dated Nov. 20, 2015" received in U.S. Appl. No. 14/682,004.
"Non-Final Office Action dated May 1, 2014" issued in U.S. Appl. No. 13/465,997.
"Non-Final Office Action dated Oct. 21, 2014," U.S. Appl. No. 13/465,997.
"Notice of Allowance dated Feb. 4, 2015" received in U.S. Appl. No. 13/465,997.
"Non-Final Office Action dated Jan. 3, 2013" issued in U.S. Appl. No. 13/466,002.
"Final Office Action dated Jul. 19, 2013" issued in U.S. Appl. No. 13/466,002.
"Non-Final Office Action dated Sep. 23, 2014" received in U.S. Appl. No. 13/466,002.
"Final Office Action dated Apr. 8, 2015" issued in U.S. Appl. No. 13/466,002.
"Non-Final Office Action dated Feb. 9, 2016" received in U.S. Appl. No. 13/466,002.
"Notice of Allowance dated Jul. 20, 2016" received in U.S. Appl. No. 13/466,002.
U.S. Appl. No. 61/562,377.
U.S. Appl. No. 61/527,485.
Newton, "API", Newton's Telecom Dictionary, 18th Ed., Feb. 2002, 1 page.
"Software." The Authoritative Dictionary of IEEE Standard Terms. $7^{th}$ ed. 2000 pp. 1067.
Non-Final Office Action dated Dec. 4, 2014 issued in corresponding U.S. Appl. No. 13/465,931.
Notice of Allowance dated Mar. 27, 2015 issued in corresponding U.S. Appl. No. 13/465,931.
Final Office Action dated Mar. 26, 2018 issued in corresponding U.S. Appl. No. 14/801,784.
Final Office Action dated Sep. 5, 2018 issued in corresponding U.S. Appl. No. 14/801,784.
Non-Final Office Action dated Feb. 26, 2019 issued in corresponding U.S. Appl. No. 14/801,784.
Non-Final Office Action dated Oct. 26, 2017 issued in corresponding U.S. Appl. No. 13/465,960.
Final Office Action dated Jun. 18, 2018 issued in corresponding U.S. Appl. No. 13/465,960.
Non-Final Office Action dated Feb. 4, 2014 issued in corresponding U.S. Appl. No. 13/465,975.
Non-Final Office Action dated Jun. 2, 2017 issued in corresponding U.S. Appl. No. 15/362,617.
Final Office Action dated Dec. 28, 2017 issued in corresponding U.S. Appl. No. 15/362,617.
Non-Final Office Action dated Jun. 19, 2018 issued in corresponding U.S. Appl. No. 15/362,617.
Final Office Action dated Feb. 19, 2019 issued in corresponding U.S. Appl. No. 15/362,617.
Non-Final Office Action dated Aug. 8, 2017 issued in corresponding U.S. Appl. No. 13/465,987.
Final Office Action dated Dec. 27, 2017 issued in corresponding U.S. Appl. No. 13/465,987.
Notice of Allowance dated Sep. 20, 2018 issued in corresponding U.S. Appl. No. 13/465,987.
Anonymous, Altair Introduces Advanced Scheduling Features With PBS Professionals, 9.2 Eligible Time, Turnable Formula and Standing Reservations Help Customers Achieve Higher ROI, May 20, 2008, PR Newswire.
Buyya et al., "Cloud Computing: Principles and Paradigms".
Non-Final Office Action issued in U.S. Appl. No. 15/339,460 dated May 3, 2019.
U.S. Notice of Allowance issued in U.S. Appl. No. 15/339,460 dated Sep. 18, 2019.
U.S. Non-Final Office Action issued in U.S. Appl. No. 13/465,960 dated Sep. 18, 2019.

\* cited by examiner

EXTENSIBLE WORKFLOWS FOR PROCESSING CONTENT

CROSS-REFERENCE TO RELATED APPLICATIONS

This is a continuation application of U.S. patent application Ser. No. 13/465,978, filed on May 7, 2012, entitled "EXTENSIBLE WORKFLOWS FOR PROCESSING CONTENT," which is hereby incorporated herein by reference in its entirety.

BACKGROUND

In recent years, there has been a surge of development and releases of new types of mobile devices made available to the public. Today's consumer is often equipped with a smart phone, tablet, MP3 player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. These companies are looking for encoding systems and services that can provide the best video/audio quality to consumers at a low cost. Because digital video (and audio) content is often delivered to multiple device types over unmanaged networks with fluctuating bandwidth, it is desirable to utilize transcoding to produce a version of each asset to accommodate these variants.

In this context, many companies need to perform a wide variety of functions on media content. Besides encoding or transcoding, throughout the lifecycle of a media asset, a variety of other aspects of content may need to be changed, added or manipulated, such as advertisement, personalization or security information. Moreover, a plurality of otherwise unrelated business entities may be involved in the handling of the media asset throughout its lifecycle. All of these independent processes need to be managed and controlled, allowing businesses and enterprises to provide an optimal media delivery infrastructure for media consumers.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for processing content using one or more workflows. In particular, embodiments described herein can provide approaches for creating extensible workflows to perform transcoding and other processing jobs on content such as media content (e.g. video, audio or multimedia content).

In accordance with various embodiments, a media transcoding and processing service is described that provides one or more preconfigured workflows for processing media content. The service further enables a user, application, or other such entity to extend one or more of the preconfigured workflows by injecting one or more customized tasks into the workflow. In accordance with an embodiment, a workflow can specify one or more processing jobs to be performed on the media content in a particular order or sequence. These processing jobs can include a wide variety of media processing, such as transcoding the media content from one encoding format to another, transmuxing the media content, digital watermarking the media content, segmenting the media content, applying access controls to the media content, adding meta data to the media content, inserting advertisements into the media content, translating the media content into one or more languages, transcribing the media content, changing bit rates of the media content, sequencing the media content, changing or adding audio to the media content or the like. For example, a workflow may first transcode the media content to produce several copies in different encoding formats, then add a unique watermark to each copy of the media content and then deliver the transcoded copies to various viewers (e.g. end user devices) over a content delivery network.

In accordance with an embodiment, the workflow may include one or more entry points between the various tasks of the workflow and the service enables a user (e.g. a content publisher, third party, etc.) to inject a custom processing task at a specified entry point in the workflow. In one embodiment, the service exposes an application programming interface (API) that can be accessed by the user to specify the particular entry point and the custom action or task that will be added to the preconfigured workflow. For example, at any point in the workflow, a user can institute one or more actions that can stop the preconfigured workflow and start the custom workflow or service specified by the user. Once the specified action or service has completed processing the media content, the preconfigured workflow can continue with the predetermined sequence of tasks. Alternatively, rather than waiting for the custom task to complete, the preconfigured workflow may continue processing while the custom service is being carried out or terminate the workflow entirely.

In accordance with various embodiments, the custom task injected into the preconfigured workflow can include performing a variety of processing jobs, such as adding digital rights management (DRM), allowing access to the media content by third parties, injecting advertisements or other content into the media, checking the media content for errors or viruses, and the like. In some embodiments, the user may delegate access to the media content to other third parties (e.g. delegate access to an external virus scanning service in order to scan the media content for potential viruses). One action may also be to require the user to sign off on transfer of the media content to another third party (e.g. a content publisher may want manual control over signing off on a transfer to a content distributor).

In accordance with an embodiment, once the custom task has been injected into the preconfigured workflow, the system may receive and process requests to process media content by using the extended workflow. In one embodiment, the workflow may be applied to media content placed into an input store or other storage location. The service may then monitor the input store for new media content. Whenever new media content arrives in the input store, the service may inspect the attributes of the media content and initiate a preconfigured workflow (or an extended workflow) based on the attributes of the media content. The service may use regular expressions based on the name of the media content to select a particular workflow from a set of workflows to apply to the media content. For example, based on the name of the media file that arrives in the input store, the service may apply a workflow that is preconfigured to transcode the media file into a different format using a particular encoder, insert an advertisement into the media and then provide the media file to a third party content distributor.

In accordance with an embodiment, once the service selects a preconfigured workflow, it executes the preconfigured workflow until the specified entry point is reached in the workflow. Upon reaching the point, the predetermined workflow can be suspended and the custom processing task is invoked. The injected task may process the media content or provide the media content to an external third party service to process. Once the custom task has completed processing of the media content, the preconfigured workflow may resume processing the content, or alternatively, another custom task may be invoked if the user has specified accordingly.

Figure 1:
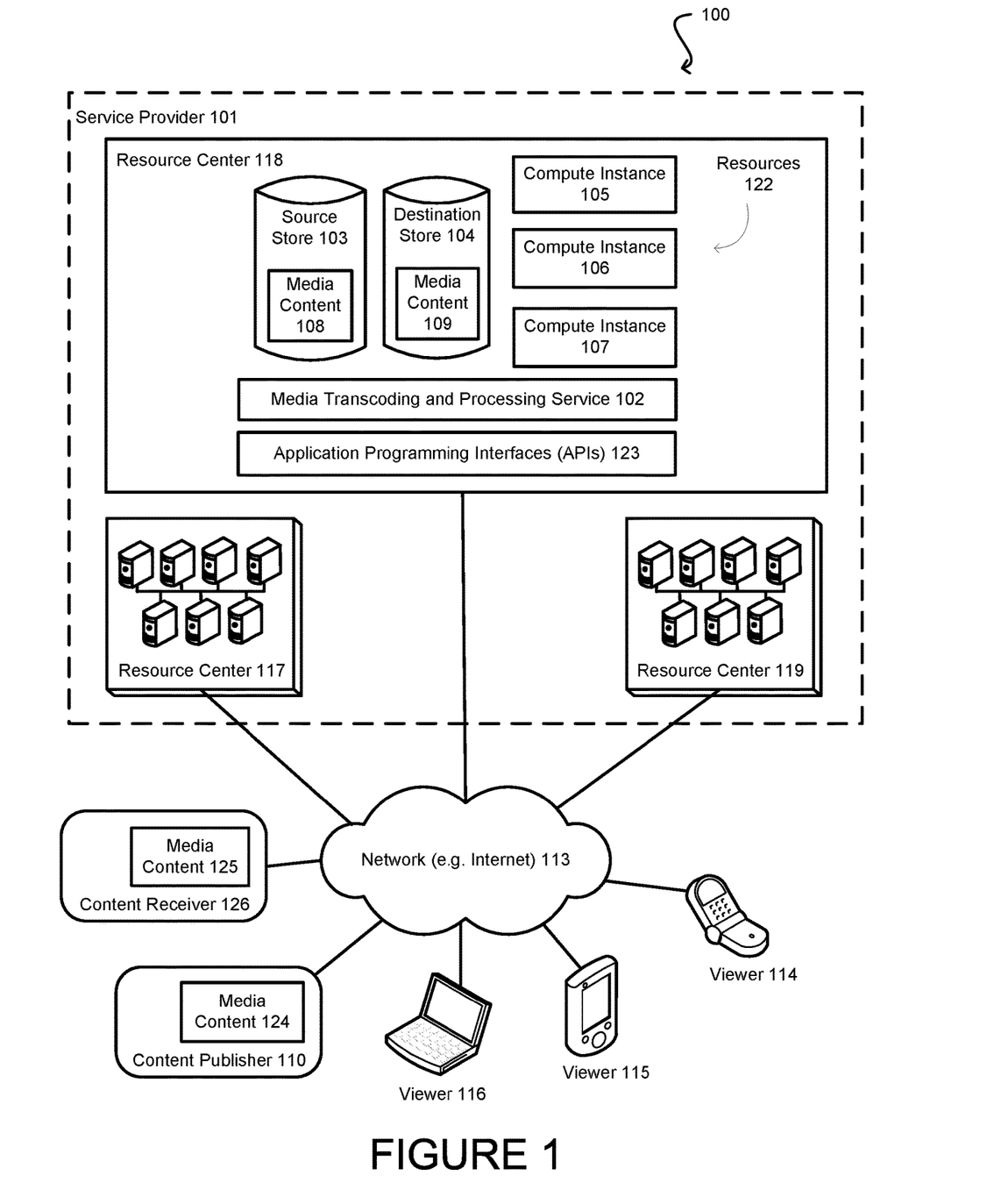
FIG. 1 is a general illustration of an environment in which the media transcoding and processing service can be implemented, in accordance with various embodiments.

FIG. 1 is a general illustration of an environment 100 in which the transcoding service can be utilized, in accordance with various embodiments.

As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer devices (114, 115, 116). In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings. Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other processing of content contained in this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using the service, such as a transcoding service. As one option, the pricing of a transcoding service could be based at least in part on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

As mentioned above, the transcoding service can be configured to accept media content in a wide variety of incoming formats and can convert the content into a comprehensive collection of output encodings, including various media formats and bitrates. The media transcoding and processing service could include an API, user portal, or graphical user interface (GUI) that includes locations (stores) for a content publisher to upload media files. The input store may include any storage, bucket, container, directory, memory location, or any other place where media can be located. In some embodiments, the input store could have a unique profile associated therewith for transcoding the media file to produce an output of the media file in various predefined media formats. There could be an input location for commonly used profiles and for combinations of commonly used profiles. Alternatively, the workflows and profiles can be selected and applied based on various attributes of the media file (e.g. file name, metadata, etc.) rather than being associated with the input store itself.

In accordance with an embodiment, whenever content is placed in a location decided upon in advance by the content publisher and the service provider, the service provider could run a predetermined workflow. For example, the content publisher's needs could be to have a daily cable news program transcoded into formats for devices running Android® and Apple® IOS operating systems after the program airs each day, with advertisements and access controls applied to the media file. These needs can be expressed as a workflow conveyed to the service provider by way of an API or some other interface exposed to the content publisher. In one instance, the media input location could be on a server residing with the content publisher which the service provider has been granted access to. Therefore, each day, after the cable news program has aired, the service provider may automatically pull and transcode the file according the workflow conveyed by the content publisher. In another instance, the decided upon location could be a server residing with the service provider to where the content publisher uploads or pushes the file each day after the news program airs.

Figure 2:
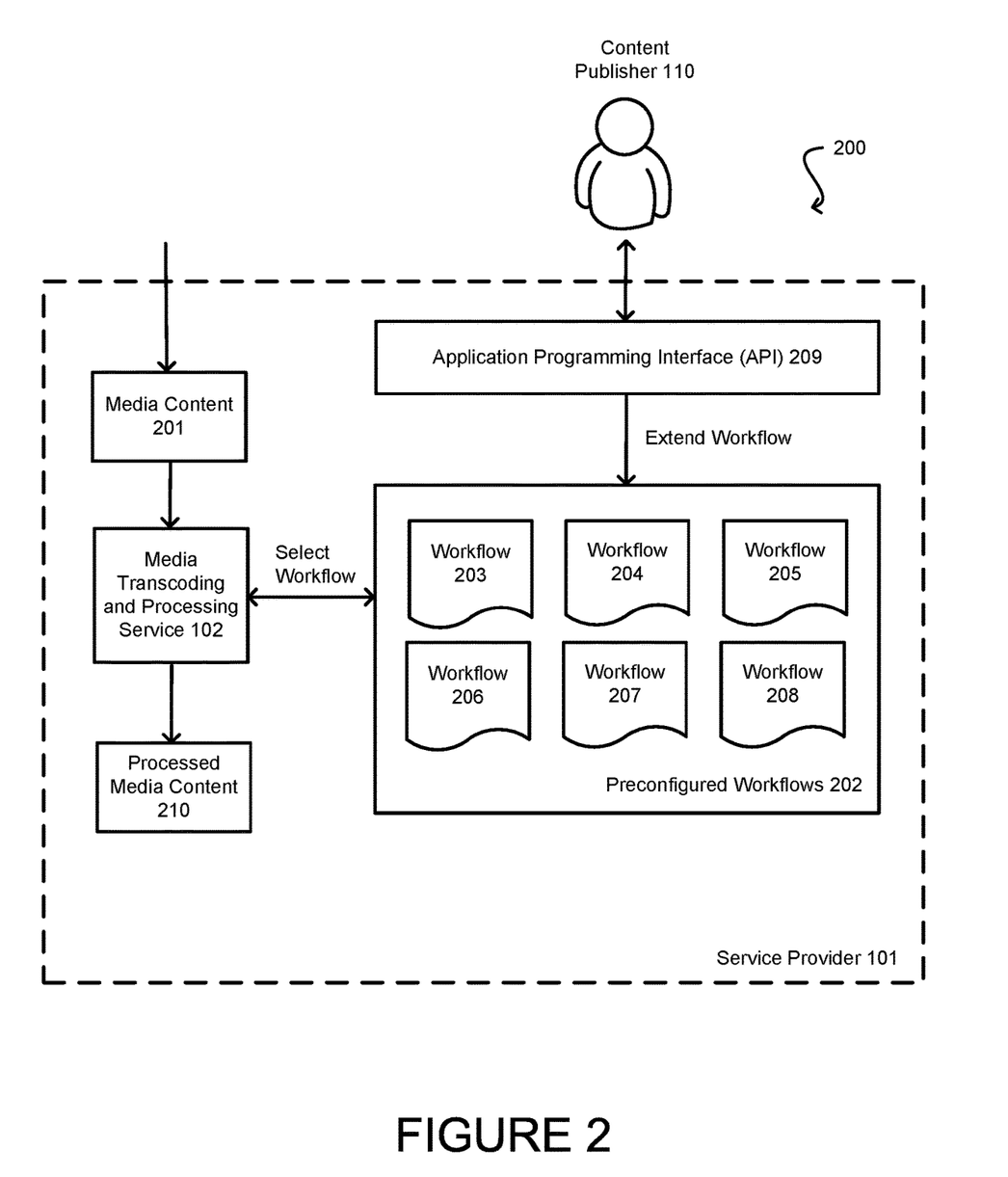
FIG. 2 illustrates an example of an environment that enables a user to create extensible workflows, in accordance with various embodiments.

FIG. 2 illustrates an example of an environment 200 that enables a user to create extensible workflows, in accordance with various embodiments.

In accordance with the illustrated embodiment, a user, such as a content publisher 110, is provided with access to an application programming interface (API) 209, or other such interface mechanism, that can be used to extend or otherwise modify any of the set of preconfigured workflows 202 provided by the service provider 101. Each of the preconfigured workflows (203, 204, 205, 206, 207, 208) that are provided by the service provider 101 can perform a specific sequence of processing jobs appropriate for a particular type of media content. By way of illustration, throughout the lifecycle of a media asset, from the time of creating the asset to delivering it to the end user, there may need to be a number of different functions and tasks that need to be performed on the media asset. For example, the media asset (e.g. video file, etc.) may need to transcoded into one or more different formats, identified by attaching a unique watermark, secured by performing DRM, monetized by injecting one or more advertisements into it or the like. In accordance with an embodiment, a predetermined workflow may perform a particular sequence of such processing tasks which are appropriate for the particular type of media content.

In addition to the preconfigured workflows (203, 204, 205, 206, 207, 208) provided by the service provider 101, the API 209 can allow a user (e.g. content publisher 110) to inject another service offering into the workflow that will be applied to the media associated with that user. For example, the user may specify that after predetermined workflow encodes the media content into a particular format, the media content should be provided to a watermarking service to attach a watermark and then the media content should be delivered to a third party provider that provides DRM services to perform the DRM action. The content publisher 110 may specify that the custom service offering be injected into the predetermined workflow at a particular entry point. As part of specifying the custom offering, the user may specify the particular action to be performed on the media content, which entity should perform the action, a storage location where the media content should be retrieved from and placed into, and any other information relevant to the service offering. For example, the content publisher may specify that upon completing the task of encoding the media content, the preconfigured workflow should stop until the custom service offering can perform the task on the media content, at which point the workflow can continue. Any number of such custom service offerings may be injected into the predetermined workflow(s). In alternative embodiments, the content publisher 110 may use the API 209 to construct a custom workflow that performs a sequence of specified processing jobs.

It should be noted that although FIG. 2 illustrates an API 209 that is used to specify and inject the custom tasks and services into the workflow, this is not a limitation to all of the embodiments described throughout this disclosure. In various alternative embodiments, any other component can be implemented such as an event messaging model, where the user (e.g. content publisher 110) subscribes to listen for certain events in the workflow and execute specified tasks upon being notified of the events. In the messaging model embodiment, various external (third party) service providers and other entities may use messaging to plug into the workflows provided by the service provider 101 if they have been granted permissions to modify or otherwise access the media content. This can allow various independent entities (e.g. watermark provider, virus scanning service, etc.) to interact and cooperate during the lifecycle of the media content. In accordance with another embodiment, the user may be provided with a console such as a graphical user interface (GUI) that allows the user to graphically manipulate icons corresponding to the various functions in the workflow, construct new workflows, modify existing workflows and the like. As another example, the user may provide a configuration file associated with particular media content, where the configuration file specifies the workflow(s) or action(s) that are instructed to be performed on the media.

In accordance with an embodiment, once the workflows have been constructed, the media transcoding and processing service 102 can receive incoming media content 201 and select one of the set of preconfigured workflows 202 to apply to the media content. If the selected workflow has any custom extensions that have been specified by the content publisher 110 or other user, the service can execute the extensions upon the appropriate point in the workflow. Once the workflow has completed processing the media content, the processed media content 210 (e.g. transcoded and watermarked content, etc.) can be placed into the designated output store, delivered to various viewers (e.g. end users) and the like.

Figure 3:
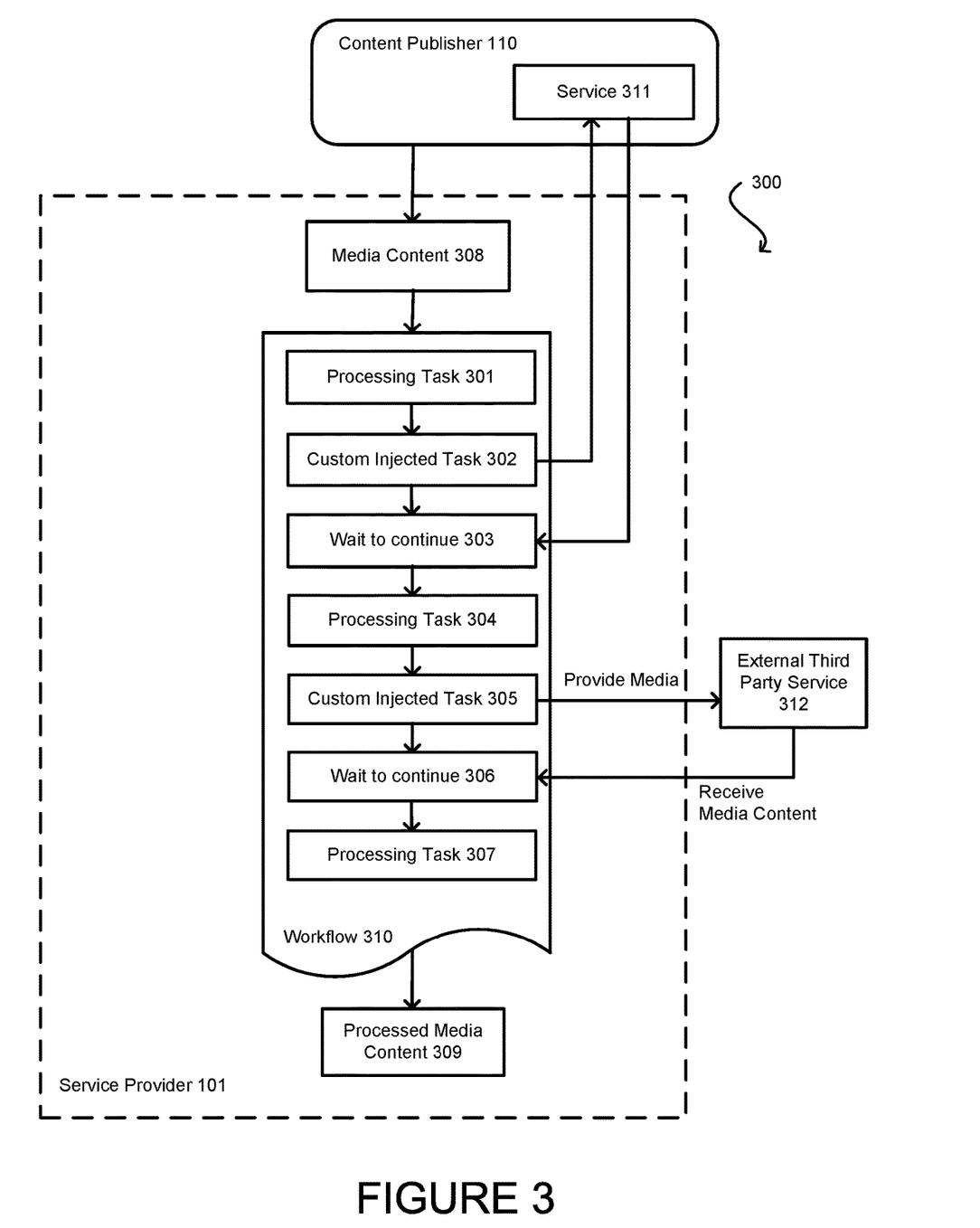
FIG. 3 illustrates an example of a workflow that includes several extensions that have been specified by a user, in accordance with various embodiments.

FIG. 3 illustrates an example 300 of a workflow that includes several extensions that have been specified by a user, in accordance with various embodiments.

In the illustrated embodiment, a user, such as the content publisher 110, has added several customized service extensions to the predetermined workflow 310. The extended workflow thus contains a set of processing tasks (301, 302, 303, 304, 305, 306, 307) which will be applied in a particular order or sequence to the media content 308 received by the service provider 101. In one embodiment, the media transcoding and processing service monitors an input store (or other location) and whenever media content is placed into the input store, the service selects the workflow to be applied to it based on a particular policy. For example, the service may inspect the attributes of the media file (e.g. file name, file type, metadata, etc.) automatically determine which workflow(s) to apply. In alternative embodiments, the predetermined workflow is selected based on the input store to which the content is uploaded.

In accordance with the illustrated embodiment, the workflow contains a set of processing tasks (301, 302, 303, 304, 305, 306, 307) to be applied to the media content 308. By way of example, the processing task 301 may include transcoding the media content into a format (e.g. H.264) by using an encoder. As such, the processing task 301 may invoke an appropriate number of compute instances to perform the transcoding the media content 308, as previously mentioned.

Once the encoding is successful, the workflow may invoke the first custom processing task 302 that was injected by the user (e.g. content publisher). In the illustrated embodiment, the custom task 302 may transfer control of the media content to a service 311 that resides on the system of the content publisher 110. The service 311 may perform any function that the content publisher wishes to execute, such as adding a unique watermark (e.g. company logo) or advertising material to the transcoded media content. In one embodiment, the custom task 302 may simply be the content publisher reviewing the media content and confirming that it meets the content publisher's quality. In accordance with an embodiment, the preconfigured workflow 310 may be placed in a suspended state 303 while it waits for the custom task to be completed by the system on the content publisher and the media content to be returned. In an alternative embodiment, the preconfigured workflow 310 may initiate a split and continue to process its preconfigured tasks while the custom task is being carried out. In yet another embodiment, the workflow may terminate upon reaching the custom task and causing it to be invoked.

Once the media content is returned, the workflow can resume and initiate the processing task 304. For example, processing task 304 may transcode the media content into another format, change the audio track of the media, or perform any other work on the media content. Upon completion of the processing task 304, the workflow 310 may invoke another custom task 305 which was specified by the user. In the illustrated embodiment, the custom task 305 may invoke an external third party service 312 to perform a particular function on the media content. For example, the external service 312 may be a DRM service provider that applies a set of DRM techniques (e.g. encryption, security data, etc.). As another example, the external service provider may be an antivirus software provider that scans the media content for potential known viruses or other malware. The preconfigured workflow may then wait in a suspended state 306 until the external service 312 has completed processing of the configured workflow, before continuing with the next processing task 307.

In accordance with the illustrated embodiment, once the workflow completes processing task 307, it may place the processed media content 309 into a predetermined location. For example, the processed media content 309 may be placed into an origin server for distribution to various viewers (e.g. end user devices) by way of a content delivery network. Alternatively, the processed media content 309 may be provided to the content publisher 110 or any other entity.

Figure 4:
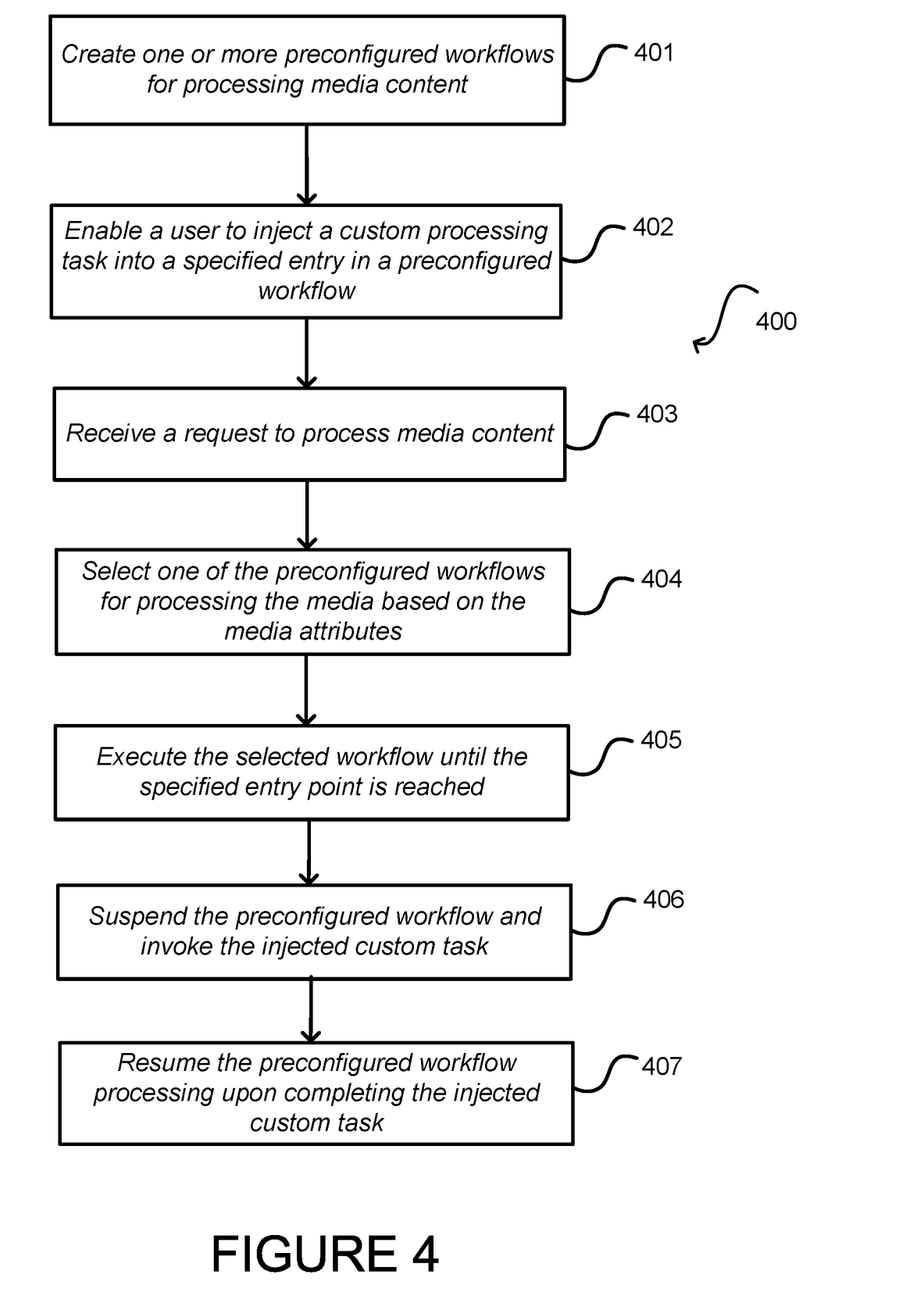
FIG. 4 illustrates an example process for using extensible workflows for processing media content, in accordance with various embodiments.

FIG. 4 illustrates an example process 400 for using extensible workflows for processing media content, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, a set of preconfigured workflows are created for processing media content. In accordance with an embodiment, the workflows are created (or otherwise obtained) by a service provider or other system for enabling users (e.g. content publishers, etc.) to provide their media content for processing by one or more of the workflows. For example, a user may designate that a particular workflow be applied to a specified type of media uploaded from the user and that the resulting media content be placed in a designated location. In at least one embodiment, the processing tasks of the workflow may include transcoding the media content from one encoding format into one or more other formats.

In operation 402, the service provider enables a user to extend a preconfigured workflow by injecting at least one custom processing task into a particular entry point in the workflow. For example, upon completion of one preconfigured task in the workflow, the user may specify that the media content be provided to an external service for performing the custom task. In accordance with various embodiments, the extensions to the workflow can be made by using an API, console, messaging/event model, configuration file or any other ways.

In operation 403, the service receives a request to process a set of media content. The request may be received as a result of the media content being placed into an input store or other designated location. Alternatively, the request may be received by way of a web services API, message, or other methods.

In operation 404, the service inspects the attributes of the media content (e.g. file name, file size, metadata, etc.) and selects at least one of the preconfigured workflows to apply to the media content. For example, the service may parse the filename of the media file and use a regular expression based on the filename to determine which tasks/workflow should be applied to the media file. Alternatively, the service may inspect the metadata of the media file and where the content publisher has specified which workflow or processing tasks should be applied to the media.

In operation 405, the service initiates the selected preconfigured workflow. In accordance with an embodiment, if the preconfigured workflow contains any custom extensions, the workflow continues processing until it reaches an entry point specified by the user. The entry points may be located upon completion of each processing task or before the start of a processing task.

In operation 406, once the specified entry point is reached, the service suspends the workflow and triggers the custom processing task that was specified by the user. The custom task may invoke an external third party service or application. In accordance with an embodiment, the workflow remains suspended until the custom processing task is completed. For example, the workflow may hand control of the media file to an external service and wait until the external service returns the media file back to the workflow.

In operation 407, once the custom task is completed, the preconfigured workflow can resume processing the media content. For example, once an external antivirus software provider returns the media content with a confirmation that the content does not contain any known viruses; the workflow may provide the media content to an origin store for delivery to end users over a content delivery network.

Figure 5:
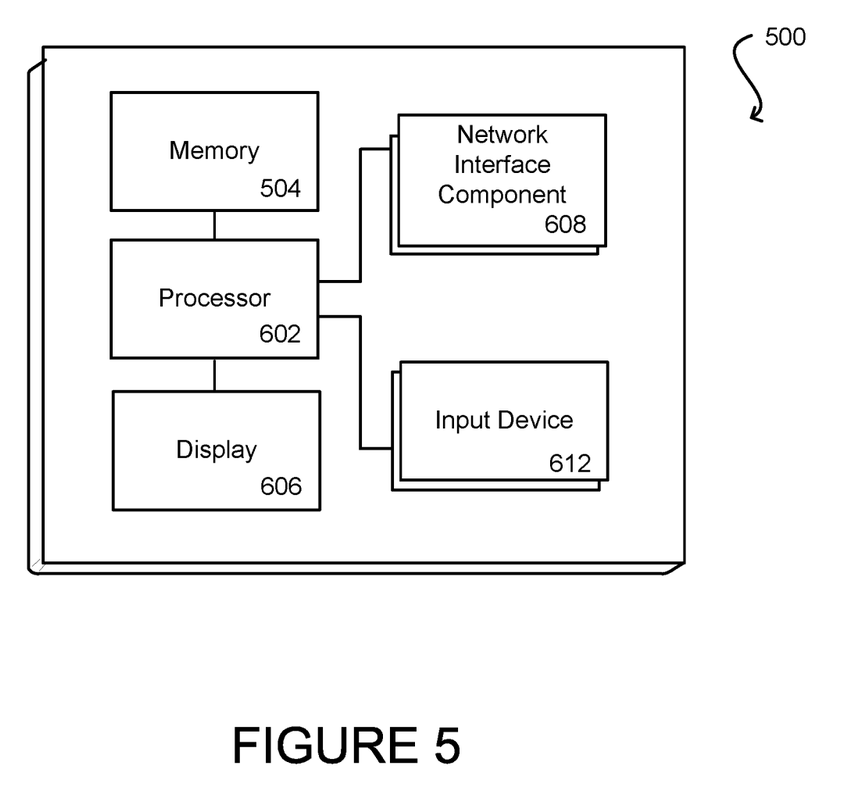
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable storage medium storing one or more sequences of instructions executable by one or more processors to perform a set of operations comprising:
   enabling access to a plurality of workflows for processing media content, a workflow of the plurality of the workflows including a sequence of processing jobs to be performed on the media content, the sequence of processing jobs including transcoding the media content;
   selecting, based on attributes of the media content, the workflow for processing the media content;
   exposing an application programming interface (API), the API used to specify a custom processing task and an entry point in the workflow;
   injecting the custom processing task into the workflow at the entry point, resulting in a modified workflow;
   providing processing parameters for the modified workflow to process the media content, the processing parameters associated with the attributes of the media content or the custom processing task to be included into the sequence of processing jobs;
   uploading the media content for processing; and
   executing the modified workflow to process the media content.

2. The non-transitory computer readable storage medium of claim 1, further comprising instructions executed by the one or more processors to perform the operations of:
   suspending the workflow to inject and execute the custom processing task; and
   resuming the workflow upon receiving an indication that the custom processing task has been executed.

3. The non-transitory computer readable storage medium of claim 1, wherein the custom processing task further includes performing one or more of the following: attaching a watermark to an instance of the media content, the watermark used to uniquely identify the media content, applying digital rights management (DRM) security information to the instance of media content, inserting at least one advertisement into the instance of media content, inspecting the instance of media content for one or more errors, or scanning the instance of media content for potential viruses.

4. The non-transitory computer readable storage medium of claim 1, further comprising instructions executed by the one or more processors to perform the operations of:
   storing the processed media content, wherein the processed media content is stored locally on a non-transitory storage medium.

5. The non-transitory computer readable storage medium of claim 1, further comprising instructions executed by the one or more processors to perform the operations of:
   caching the media content at a network edge; and processing the media content or at least a portion of the media content on a per-request basis based at least in part on the attributes of the media content or the processing parameters.

6. The non-transitory computer readable storage medium of claim 1, wherein the instructions executed by the one or more processors to perform the operations of processing the media content includes:
   determining computing devices for viewing the media content; and
   at least transcoding the media content into formats viewable on the computing devices.

7. The non-transitory computer readable storage medium of claim 1, further comprising instructions executed by the one or more processors to perform the operations of:
   determining usage of compute instances to execute the workflow to process the media content;
   calculating an appraisal for processing the media content based at least in part on the usage; and
   notifying a user of the appraisal for processing the media content.

8. A computing system, comprising:
   at least one processor; and
   memory including instructions that, when executed by the processor, cause the computing system to:
   enable access to a plurality of workflows for processing media content, a workflow of the plurality of the workflows including a sequence of processing jobs to be performed on the media content, the sequence of processing jobs including transcoding the media content;
   select, based on attributes of the media content, the workflow for processing the media content;
   expose an application programming interface (API), the API used to specify a custom processing task and an entry point in the workflow;
   inject the custom processing task into the workflow at the entry point, resulting in a modified workflow;
   provide processing parameters for the modified workflow to process the media content, the processing parameters associated with the attributes of the media content or the custom processing task to be included into the sequence of processing jobs;
   upload the media content for processing; and
   execute the modified workflow to process the media content.

9. The computing system of claim 8, wherein the memory includes instructions that, when executed by the processor, further cause the computing system to:
   suspend the sequence of processing jobs to inject and execute the custom processing task; and
   resume the sequence of processing jobs upon receiving an indication that the custom processing task has been executed.

10. The computing system of claim 8, wherein the custom processing task further includes performing one or more of the following: attaching a watermark to an instance of the media content, the watermark used to uniquely identify the media content, applying digital rights management (DRM) security information to the instance of media content, inserting at least one advertisement into the instance of media content, inspecting the instance of media content for one or more errors, or scanning the instance of media content for potential viruses.

11. The computing system of claim 8, wherein the memory includes instructions that, when executed by the processor, further cause the computing system to:
   store the processed media content, wherein the processed media content is stored locally on a non-transitory storage medium.

12. The computing system of claim 8, wherein the memory includes instructions that, when executed by the processor, further cause the computing system to:
   cache the media content at a network edge; and
   process the media content or at least a portion of the media content on a per-request basis based at least in part on the attributes of the media content or the processing parameters.

13. The computing system of claim 8, wherein the memory includes instructions that, when executed by the processor, further cause the computing system to:
   monitor usage of compute instances to processing the media content;
   calculate an appraisal for processing the media content based at least in part on the usage; and
   transmit a notification of the appraisal for processing the media content.

* * * * *